(12) United States Patent
Carasa Ruiz et al.

(10) Patent No.: US 12,382,952 B2
(45) Date of Patent: Aug. 12, 2025

(54) CRYOSTORAGE DEVICE

(71) Applicant: Overture Life, Inc., New York, NY (US)

(72) Inventors: Pablo Carasa Ruiz, Madrid (ES); Luis Morgado García, Madrid (ES); Lionel Matthys, Madrid (ES); Cristina Dosdá Munuera, Madrid (ES)

(73) Assignee: Overture Life, Inc., New York, NY (US)

( * ) Notice: Subject to any disclaimer, the term of this patent is extended or adjusted under 35 U.S.C. 154(b) by 755 days.

(21) Appl. No.: 17/700,848

(22) Filed: Mar. 22, 2022

(65) Prior Publication Data

US 2022/0346371 A1 Nov. 3, 2022

Related U.S. Application Data

(60) Provisional application No. 63/164,671, filed on Mar. 23, 2021.

(51) Int. Cl.
*A01N 1/147* (2025.01)
*B01L 3/02* (2006.01)

(52) U.S. Cl.
CPC .............. *A01N 1/147* (2025.01); *B01L 3/021* (2013.01); *B01L 2200/026* (2013.01); *B01L 2400/0694* (2013.01)

(58) Field of Classification Search
CPC ..... A01N 1/47; B01L 3/021; B01L 3/502715; B01L 2200/026; B01L 2200/027; B01L 2300/044; B01L 2300/047; B01L 2300/0672; B01L 2300/0816; B01L 2300/0887; B01L 2400/0694; B01L 2400/0406; B01L 2400/0481;
(Continued)

(56) References Cited

U.S. PATENT DOCUMENTS 5,217,693 A * 6/1993 Anderson ................ A01N 1/10
436/178
5,545,562 A 8/1996 Cassou et al.
(Continued)

FOREIGN PATENT DOCUMENTS

CN 203040526 U 7/2013
EP 2198804 A1 6/2010
(Continued)

OTHER PUBLICATIONS

510(k) Premarket Notification Summary for Kitazato's Cryotop CL, K112695, Kitazato Bio Pharma Co., Ltd., Shizuoka, Japan, Dec. 12, 2012, pp. 1-4.
(Continued)

*Primary Examiner* — Michael L Hobbs (57) ABSTRACT

Disclosed herein are cryostorage devices, systems, and methods for cryopreservation or vitrification of biological materials, such as oocytes and embryos. These cryostorage devices can include a capillary straw with the dual functionality for loading/unloading a sample. The devices can also include a self-sealing mechanism and an adapter for coupling with pipettes to enable loading of a predetermined volume of sample. The devices can also include a removable cap to protect the capillary during long-term cryostorage. Methods described herein relate to the manual or automated use of such devices.

15 Claims, 6 Drawing Sheets

(58) Field of Classification Search
CPC ....... B01L 2400/0677; B01L 2400/086; G01N 33/5005
See application file for complete search history.

(56) References Cited

U.S. PATENT DOCUMENTS

| | | | |
|---|---|---|---|
| 5,770,158 | A | 6/1998 | Eischen et al. |
| 6,838,278 | B2 | 1/2005 | Fortino |
| 7,316,896 | B2 | 1/2008 | Kuwayama et al. |
| 7,709,268 | B1 | 5/2010 | Edwards et al. |
| 7,984,616 | B2 | 7/2011 | Fuhr et al. |
| 11,071,295 | B2 | 7/2021 | Munne et al. |
| 2004/0259072 | A1 | 12/2004 | Kuwayama et al. |
| 2005/0064579 | A1 | 3/2005 | Loskutoff et al. |
| 2005/0287512 | A1 | 12/2005 | Cullis et al. |
| 2006/0009712 | A1 | 1/2006 | Bladel et al. |
| 2008/0233633 | A1 | 9/2008 | Clairaz et al. |
| 2009/0093065 | A1 | 4/2009 | Ding et al. |
| 2010/0311036 | A1 | 12/2010 | He |
| 2011/0143968 | A1* | 6/2011 | Chen .................. A61B 5/1438 422/550 |
| 2013/0137080 | A1 | 5/2013 | Henderson et al. |
| 2013/0260452 | A1 | 10/2013 | Toner et al. |
| 2014/0308655 | A1 | 10/2014 | Mogas et al. |
| 2015/0237848 | A1 | 8/2015 | Schmitt et al. |
| 2020/0146280 | A1 | 5/2020 | Silverman et al. |
| 2022/0132836 | A1 | 5/2022 | Munne et al. |

FOREIGN PATENT DOCUMENTS

| | | |
|---|---|---|
| EP | 2765181 B1 | 7/2016 |
| GB | 2452562 A | 3/2009 |
| WO | 2004042341 A2 | 5/2004 |
| WO | 2011070973 A1 | 6/2011 |
| WO | 2011144352 A1 | 11/2011 |
| WO | 2013098825 A1 | 7/2013 |
| WO | 2014106286 A1 | 7/2014 |

OTHER PUBLICATIONS

European Search Report dated Nov. 3, 2021 for EP Appl. No. 21170538.9.
International Search Report and Written Opinion dated May 5, 2020 for International Application Serial No. PCT/US2019/068299, (19 pages).
International Search Report dated Aug. 24, 2022 for PCT/US2022/021270.

* cited by examiner

CRYOSTORAGE DEVICE

CROSS-REFERENCE

This application claims the benefit of U.S. Provisional Application No. 63/164,671, filed, Mar. 23, 2021, which is incorporated herein by reference in its entirety.

BACKGROUND

Assisted reproduction is a large and growing market. To reduce the risk of infertility, a growing number of women to have begun to cryopreserve their oocytes for use in assisted reproduction in the future for the purpose of fertility preservation. Furthermore, many patients undergoing in vitro fertilization (IVF) can produce more viable embryos than desired and often choose to preserve the surplus embryos.

INCORPORATION BY REFERENCE

Each patent, publication, and non-patent literature cited in the application is hereby incorporated by reference in its entirety as if each was incorporated by reference individually.

DETAILED DESCRIPTION

Disclosed herein are cryostorage devices, systems, and methods for loading, unloading, and storing samples before, after, and during cryopreservation. For example, disclosed herein are cryostorage devices, systems, and methods for loading, unloading, and storing oocytes or embryos for the purpose of cryopreservation. A cryostorage device disclosed herein can comprise a hollow body with a self-sealing valve on one side and a capillary element (or straw) joined to the opposite side of the hollow body. The storage device can be used manually, directly, or with a pipette (e.g., a micropipette, a Stripper™ micropipette, or a robotized pipette) for loading and unloading a sample in the capillary element or straw. The pipette can be connected to the hollow body of the device or connected to a pipette adapter that is coupled to the hollow body of the device. The pipette can facilitate the loading and unloading of sample in the capillary element. Further disclosed herein is a pipette adapter and a system comprising the pipette adapter, the cryostorage device, and the pipette.

Vitrification is a cryopreservation technique that reduces the likelihood of crystallization and the formation of crystals inside cells, e.g., an oocyte or embryo, through the presence of a viscous medium that cools at very high speeds. During vitrification, liquid within the cells becomes more viscous until the liquid molecules become immobilized and acquire the proprieties of a solid. In this case, the resulting solid has a glassy, non-crystalline consistency.

When vitrification is performed correctly, damage to the cells through ice crystal formation is avoided by protecting the cells against the chilling effect. Nonetheless, the cells may still be damaged as the process can expose the cells to very high concentrations of cryoprotectant agents (CPA), which can be toxic to cells. Proper CPA treatment methods and mixtures can mitigate these adverse effects, while taking advantage of the cryoprotective effects of CPA. For example, a combination of ethylene glycol, dimethyl sulfoxide, and sucrose can be used as CPA. Another strategy to enhance cell viability during cryopreservation is to considerably reduce the volume of media surrounding the cells that are to be vitrified, thereby drastically increasing the speed of freezing and reducing the CPA concentration and the associated toxic effects.

Ice crystal formation can be effectively avoided by using high CPA concentrations while reducing the volume of media surrounding cells, thereby increasing cooling rates. Warming rates can also be important for cryosurvival because recrystallization can occur when warming rates are too low, which can also damage the cell. Thus, very high cooling and warming rates can be fundamental requirements for the success of the vitrification process.

Various devices and protocols can improve the vitrification procedure. Two types of devices are open system devices and closed system devices. Open system devices can allow direct contact between an oocyte/embryo and the coolant, e.g., liquid nitrogen (LN2). Closed system devices can contain a physical barrier between the oocyte/embryo and the LN2, thereby preventing direct contact and reducing the chance of viral contamination.

In the closed systems, the oocytes or embryos can be loaded into small capillary tubes, which are then heat-sealed closed. These closed systems can prevent viral contamination as there is a physical barrier between the oocyte/embryo and the cryopreservation media, e.g., LN2. However, in some cases, issues can arise due to air trapped inside the sealed capillary tubes. If the warming is done incorrectly, fast heating can lead to rapid expansion of the trapped air, which can rupture the capillary tubes.

Further, many alternative closed system devices can contain a component for storing the oocytes or embryos, and another component, such as a separate cover, for protection. There are two disadvantages to such devices. One disadvantage is that the oocytes or embryos must be placed on such components with the use of a manual pipette or micropipette, which requires both manual handling and a high level of dexterity. Furthermore, the cover needs to be placed over the holder while both components are fully submerged in LN2. This process can require the use of tweezers, which can be inconvenient, time-consuming, and often require several attempts to execute.

In view of the above, an effective cryostorage device can include:
- a minimum thermal path between the oocyte/embryo and the LN2 to allow fast cooling and warming rates; and
- a closed system for regulatory purposes.

Additionally, to be compatible with existing workflows, the device can:
- have a similar form factor to other cryostorage devices, e.g., having a length of approximately 130 mm and cross-sectional area of approximately 7 $mm^2$ to 15 $mm^2$;
- allow ease of loading and unloading of sample; and
- be labeled with patient or sample identifiers.

Other desirable attributes of a cryostorage device can:
- include minimized ancillary components;
- include minimized manual processing interactions with the device; and
- require minimal technical skills required for operating the device.

Cryostorage devices described herein can allow direct loading of samples with one hand, thereby avoiding a two-step manual workflow. Sample loading onto these devices can be performed using either the device directly or adapted with a standard pipette (e.g., a Stripper™ micropipette). In some cases, a pipetting robot can be used to ensure ease of use and reduced human error, but also permitting automation of this step. Further features of the devices include a minimal thermal path, a valve with a self-sealing mechanism, and a cover to achieve a closed vitrification system. During the warming process, the valve can permit de-gassing of the capillary element to avoid rupture of the device.

In some embodiments, a cryostorage device comprises:
- a capillary element that comprises an elongated hollow portion (or straw) between a bottom opening and a top opening, wherein said elongated hollow portion of the capillary element allows a volume of a sample to be loaded into the capillary element; and
- a hollow body that comprises a cavity, an opened lower end, and an upper end, wherein said opened lower end is joined to the top opening of the elongated hollow portion of the capillary element, wherein said upper end is joined to a self-sealing valve.

The hollow body can be made of a material having suitable sealing properties and freeze tolerant (e.g., resistance to LN2). For example, the material allows the hollow body to form a vacuum seal when actuated. The material can be an elastomeric or flexible material, such as silicone, natural rubber (NR) resistant to low temperature, fluorosilicone (FVMQ), fluorocarbon (FKM), or ethylene propylene diene monomer (EPDM) rubber, among others. In some embodiments, the hollow body is made of a material suitable for coupling with a manual or automated/robotized pipette.

On the other hand, the elongated portion (straw) can be made of a transparent material that is also resistant to LN2, e.g., a thermoplastic material, such as, polycarbonate (PC), polyethylene (PET), polypropylene (PP), or polymethyl methacrylate (PMMA), among others. In some embodiments, the elongated portion (straw) is made of a thermal shock resistant and a freeze tolerant material. For example, the material is tolerant of temperatures between 37° C. and −196° C. The material can be a non-brittle material. The material can be non-transparent. The material can be plastic, PVC, or glass. The material can be metallic, such as aluminum, stainless steel, or titanium.

The self-sealing valve provides a seal between the hollow body and a pipette adapter to be coupled to the hollow body such that biological material contained within the hollow body. The valve can provide a liquid-tight seal, while providing degassing when excess pressure accumulated within the hollow body. In some embodiments, the self-sealing valve is a passive valve that self-actuated, i.e., the valve does not require user actuation. The self-sealing valve can be made of an elastomeric material, e.g., a flexible plastic material. In some embodiments, the self-sealing valve is a shut off valve, an on-off valve, or a passive valve.

In some embodiments, the elongated portion has thin walls between about 0.05 mm and about 1 mm, e.g., between about 0.1 mm and about 0.25 mm. The elongated portion can be manufactured by an extrusion process to obtain a capillary. In some embodiments, the hollow body is manufactured by overmolding injection onto the elongated portion (straw), thereby assuring the joining or bonding of both components. In some embodiments, the length of the capillary element is between about 20 mm and about 70 mm. The length of the hollow body is between about 10 mm and about 20 mm. In some embodiments, the maximum diameter of the capillary element and the upper end of the hollow body is between about 1.5 mm and about 4 mm.

In some embodiments, a cryostorage device described herein comprises a cylindrical tube that connects to the hollow body, and partially covers or shrouds the capillary element or straw. The cylindrical tube can be partially assembled within the hollow body such that the cylindrical tube is positioned between the capillary element and the hollow body. The cylindrical tube can help reinforce the capillary element, thereby reducing the likelihood of breakage of the capillary element, e.g., when a user manipulates the device during use. In some embodiments, the cylindrical tube only shrouds an area of the capillary element in which biological sample is not contained within the capillary element, i.e., the top opening of the capillary element that connects to the opened lower end of the hollow body. In this manner, the cylindrical tube does not obstruct the thermal pathway between the outer surface of the capillary element and a warming agent during a warming protocol. As such, the cylindrical tube does not affect the warming rate of the biological sample within the capillary element during a warming protocol.

In some embodiments, the cylindrical tube is manufactured by an extrusion process with a material that is more rigid than the material of the capillary element or straw is. In some embodiments, the cylindrical tube is made of a plastic material comprising ABS (Acrylonitrile Butadiene Styrene), PC (PolyCarbonate), PEEK (PolyEtherEtherKetone), POM (PolyOxyMethylene), or PSU (PolySUlfone). In some embodiments, the cylindrical tube is made of a metallic material, such as stainless steel or aluminum.

The cryostorage devices described herein can be used for loading, storing, and unloading of a biological material, e.g., oocytes and embryos. Further, these storage devices can be used for cryopreservation of a biological material, e.g., for vitrification, flash freezing, de-vitrification, thawing, or warming.

Biological material, such as oocytes and/or embryos, air, media, and/or cells, can be loaded and unloaded on a device by manually actuating the hollow body of the storage device or by using a manual or robotized pipette. In any case, the actuation tools can permit aspirating and expelling a sample volume, e.g., about 0.1 µL to about 10 µL, about 1 µL to about 5 µL, or about 2 µL to about 4 µL.

The cryostorage device can be manually activated by a user using two fingers to press against the hollow body similar to the operation of the bulb of a Pasteur pipette. Biological material (or media containing the biological material) to be loaded into the storage device can be introduced via the bottom end of the elongated hollow portion (or straw). Once the biological material is loaded into the straw, the pressure within the hollow body decreases, resulting in negative pressure within the straw. The negative pressure causes the self-sealing valve of the hollow body to close, which then allows the device to draw in the biological material by suction. After sample loading, the storage device can be plunged into a cooling media, e.g., LN2, to achieve flash freezing or vitrification of the biological material within the straw. The storage device can then be stored either short-term or long-term in LN2.

When the device is retrieved from LN2 after cryostorage, the biological material can be revived by placement of the capillary element into warmed media to warm and recover the biological material contained in the straw of the device. In some cases, introducing the device into warm media (e.g., at 37° C.) could result in pressure build-up within the straw due to the sudden change in temperature. In these cases, the self-sealing valve can function as a release valve. The pressure buildup within the straw can open the valve and release excess pressure, thereby reducing the likelihood of rupture of the device. After the contents of the straw have been devitrified, the contents can be unloaded from the straw by pressing against the hollow body, thereby allowing air to enter the straw through the valve and forcing the biological material to exit the straw through the bottom opening.

Alternatively, when precise volumes of sample are needed, e.g., when loading a specific volume of media or for a better control when loading multiple samples, the device can be used with a pipette for loading and unloading of the sample. The pipette can be coupled directly to the storage device or through a pipette adapter. The pipette can be actuated manually or by robotized means. The pipette can be used to apply negative pressure for aspirating the biological material into the capillary element, thereby loading the biological material into the device. Thereafter, the pipette can be used to apply positive pressure to expel the biological material from the straw, thereby unloading the biological material from the device. Two ways of connecting the pipette to the hollow body include: 1) using the pipette tip that enters directly into the hollow body to form a sealed connection; and 2) using an adaptor (instead of the tip) to reduce the sample volume size and improve user experience.

When the pipette and the hollow body are coupled directly, the tip of the pipette can enter into the hollow body through the upper end of the hollow body and through the self-sealing valve, thereby forcing the opening of the valve. Sample can be loaded into the capillary element by actuation of the pipette. After introducing the capillary element into the cooling media, the pipette can be decoupled from the device and the self-sealing valve can close again. After warming or thawing of the device, the pipette can be coupled again to the hollow body to unload the sample from the straw. The sample can also be unloaded manually and directly on the hollow body by using the hollow body as a small bulb pipette system.

Alternatively, the pipette can be coupled to the hollow body through an adapter that connects the storage device to the pipette. This adapter can be required when the tip of the pipette cannot be coupled with the hollow body to open the self-sealing valve, e.g., due to different geometries or constructions. In some embodiments, an adapter has a revolution body that comprises:
 an opened lower end having a conical peak;
 an opened upper end connected to a cavity within the adapter, wherein the opened upper end is configured to receive a pipette; and
 a channel within the conical peak, wherein the channel connects the cavity and the opened lower end.

In some embodiments, the conical peak is surrounded by a concentric recess, which can be configured to receive the upper end of the hollow body of the device. When the cryostorage device is coupled into the opened lower end of the adapter, the hollow body of the device enters the recess surrounding the conical peak, and the peak enters into the self-sealing valve, causing the opening of the valve. In some embodiments, the conical peak is made of a material that is more rigid than the material of the valve to enable expansion and opening of the valve when the conical peak and the hollow body are coupled. The conical peak can be configured to assure a tight seal between the conical peak and the hollow body such that biological material is contained within the hollow body when the conical peak and the hollow body are coupled. For example, the adapter can be manufactured by injection molding of polypropylene (PP), polycarbonate (PC), polymethyl methacrylate (PMMA), low density polyethylene (LDPE), or polyethylene (PET), among others. These materials and suitable alternatives thereof can achieve the functional requirements of the adapter, i.e., a suitable fit with the pipette and the storage device, and good dimensional tolerance. For example, the material allows the adapter to form a vacuum seal between the pipette and the device.

When the device and the adapter are coupled, a pipette can be coupled to an opened end of the adapter. The coupled pipette can apply a negative pressure to allow loading of sample into the capillary element or straw of the device. After loading, the capillary element or straw can be decoupled from the adapter. When the conical peak of the adapter is decoupled from the hollow body, the valve can self-seal, thereby keeping the loaded material within the capillary element. After cryopreserving the loaded sample, the adapter can be decoupled from the device. To unload the sample from the straw, the capillary element can be submerged in warm media to thaw. Thereafter, the adapter and pipette can be coupled again with the device to unload the sample.

In any of the methods described herein, the bottom opening of device can be sealed for convenience if needed. Before the final storage of the device in cooling media, e.g., LN2, for cryopreservation, the bottom opening of the device that coincides with the bottom opening of the capillary element, can be sealed. As detailed above, the upper end of the device is closed due to the self-sealing valve. To seal the bottom opening of device, the hollow portion of the straw can be sealed with a cap or cover. This protective cap or cover can protect the straw from breakage when exposed to cooling media, as well as protect the biological material from direct exposure to the cooling media. In some embodiments, sealing is performed with heat or ultrasound sealers. The hollow body of the device can act as a closure for the cap or cover.

In some embodiments, described herein is a method of cryopreservation of a biological sample, comprising:
a) aspirating the biological sample into a cryostorage device, wherein the cryostorage device comprises:
  i) a capillary element that comprises an elongated hollow portion between a bottom opening and a top opening; and
  ii) a hollow body that comprises a lower end, an upper end, and a self-sealing valve, wherein the self-sealing valve is at the upper end, wherein the hollow body is connected to the top opening of the elongated hollow portion of the capillary element through the lower end of the hollow body, wherein the aspirating the biological sample into the cryostorage device comprises aspirating the biological sample into the elongated hollow portion of the capillary element by applying pressure to the hollow body; and
b) cryopreserving the biological sample in the elongated hollow portion of the capillary element.

Subsequent to aspirating the biological sample into the cryostorage device, the method can further comprise coupling a detachable protective cover to the hollow body of the cryostorage device, wherein the cover comprises an opened end and a closed end, wherein the cover is connected to the hollow body at the opened end and shrouds the capillary element.

Cryopreserving of the biological sample comprises contacting the cryostorage device with a coolant, e.g., LN2.

The method can further comprise coupling the cryostorage device to a pipette, wherein the pipette is operably connected to the upper end of the hollow body such that the pipette actuates the cryostorage device, wherein the aspirating of the biological sample into the cryostorage device is actuated by the pipette. The cryostorage device can be coupled to the pipette by a pipette adapter described herein.

Subsequent to cryopreserving the biological sample in the elongated hollow portion of the capillary element, the method can further comprise warming the biological sample in the elongated hollow portion of the capillary element. The warming of the biological sample can comprise contacting the cryostorage device with a warming agent.

Subsequent to the warming the biological sample, the method can further comprise expelling the biological sample from the cryostorage device by applying pressure to the hollow body. The method can further comprise coupling the cryostorage device to a pipette, wherein the expelling of the biological sample from the cryostorage device is actuated by the pipette.

Devices and methods described herein can be used with any sample, e.g., a biological material, air, or media. In some embodiments, the biological material contains cells, such as oocytes, embryos, or zygotes. In some embodiments, the biological material contains human cells, such as human ova, oocytes, zygotes, or embryos. Devices and methods described herein can be used with biological material from any animal species. Non-limiting examples of biological materials include stem cells, tissue cells, primate cells, bovine cells, murine cells, leporine cells, equine cells, swine cells, porcine cells, canine cells, and feline cells.

EXAMPLES

Example 1. A Cryostorage Device Described Herein and Uses Thereof

FIGS. 1-4 show a cryostorage device 100 for use in cryopreservation. The device comprises a straw or capillary element with an elongated hollow portion 10 joined or bonded to a hollow body 20. In some embodiments, the hollow body 20 can be over-molded onto the straw or capillary element 10. The straw 10 has a bottom opening 11 and a top opening 12. The hollow body 20 is joined to the top opening 12 of the straw 10 through an opened lower end 21. The upper end 22 of the hollow body 20 comprises a self-sealing valve 24. Between the self-sealing valve 24 and the lower end 21 of the hollow body 20 is a passage 23. This cryostorage device 100 can determine the storage volume 13 in the straw 10 to be loaded with the sample, e.g., oocytes and/or embryos, along with air, media, and/or cells.

The cryostorage device 100 can also comprise a pipette adapter 30 that can be configured to couple with the hollow body 20, as shown in FIGS. 5-8. As shown in FIGS. 9-13, this pipette adapter 30 can couple the device 100 to a pipette 40 (see FIG. 10), e.g., in cases where the tip 42 (see FIGS. 12-13) of the pipette 40 does not fit inside the upper end 22 of the hollow body 20. The pipette 40 can apply a negative pressure inside the straw 10 to load the sample.

As shown in FIGS. 5-8, the pipette adapter 30 can comprise an opened lower end 35 having a conical peak 31, e.g., surrounded by a recess 32; an opened upper end 33 connected to a cavity 34 inside the adapter 30; and a channel 36 inside the conical peak 31.

Figure 1:
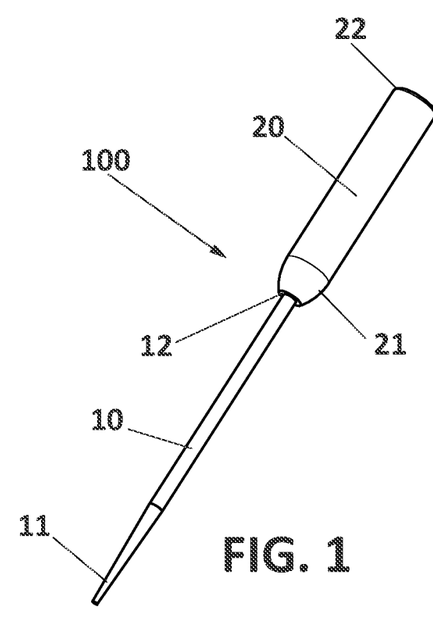
FIG. 1 shows a perspective view of a device described herein.
Figure 2:
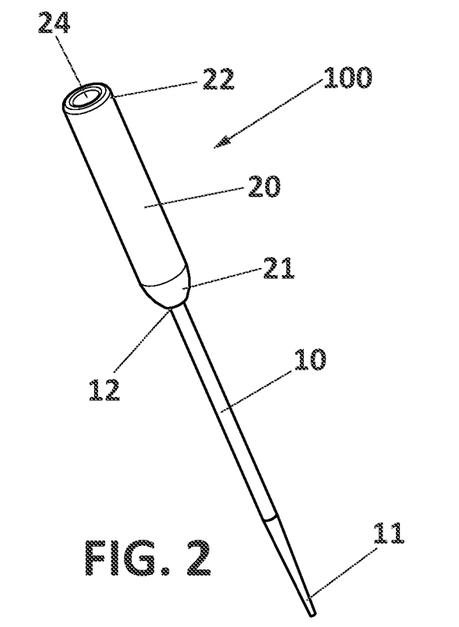
FIG. 2 shows a perspective view of a device described herein.
Figure 3:
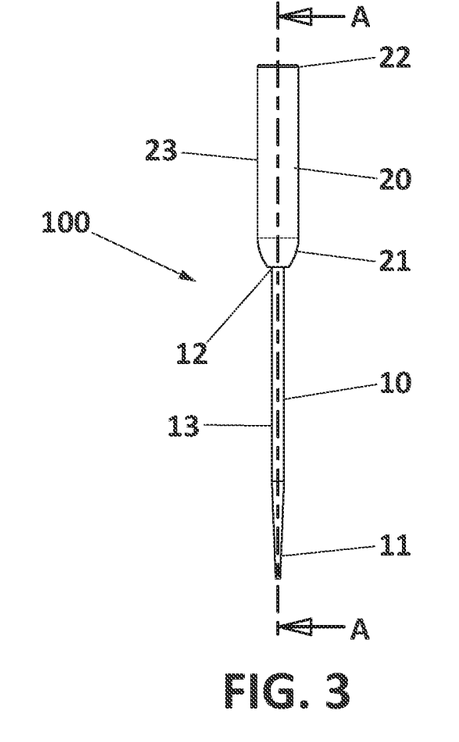
FIG. 3 shows a side view of the device of FIG. 1.
Figure 4:
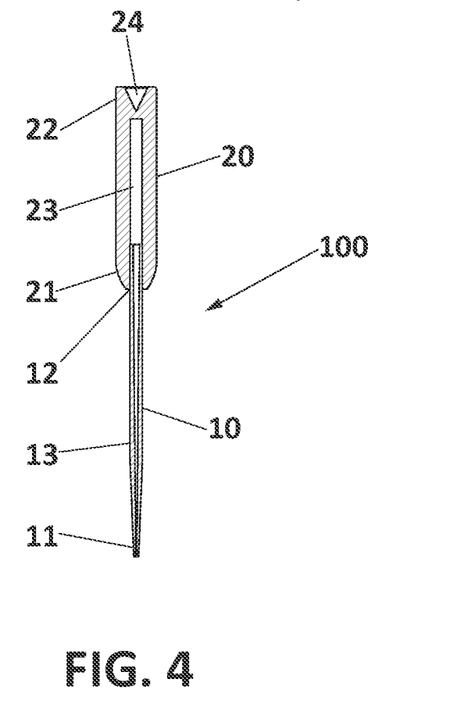
FIG. 4 shows a cross-sectional view of the device of FIG. 3.
Figures 5, 6:
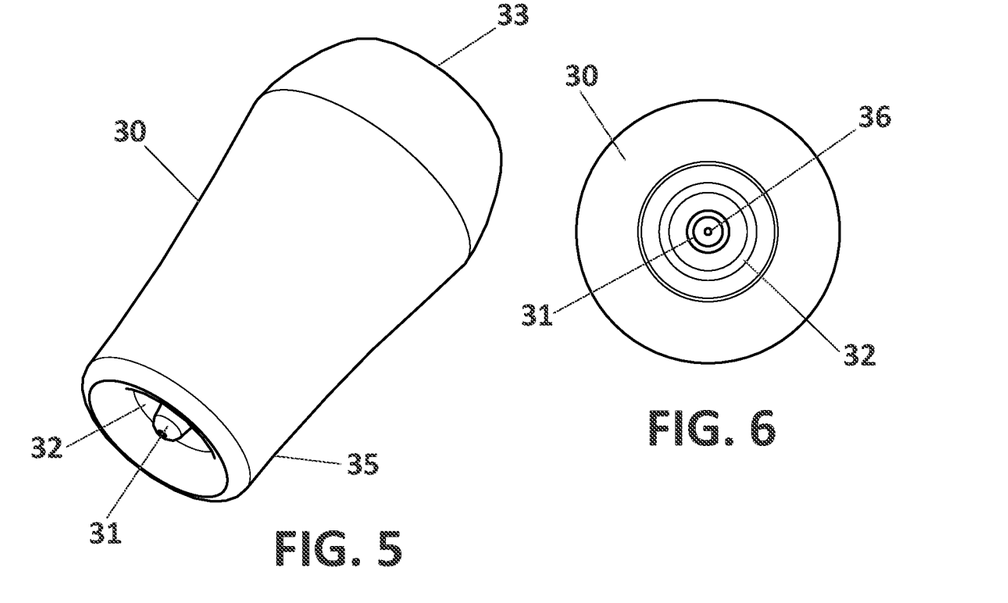
FIG. 5 shows a perspective view of a pipette adapter described herein.
FIG. 6 shows a top view of the pipette adapter of FIG. 5.
Figure 7:
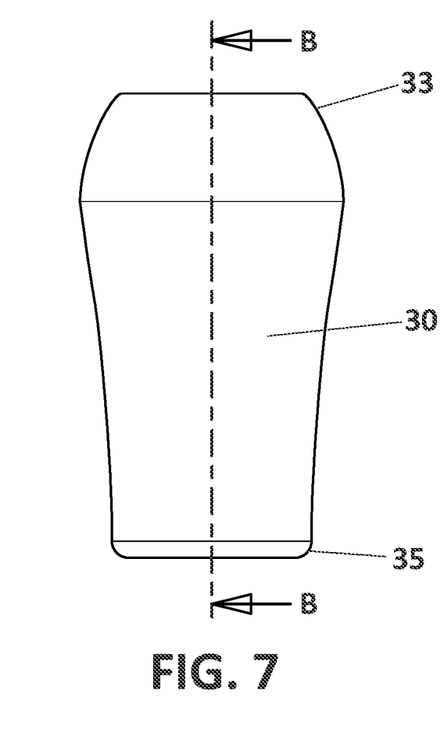
FIG. 7 shows a side view of the pipette adapter of FIG. 5.
Figure 8:
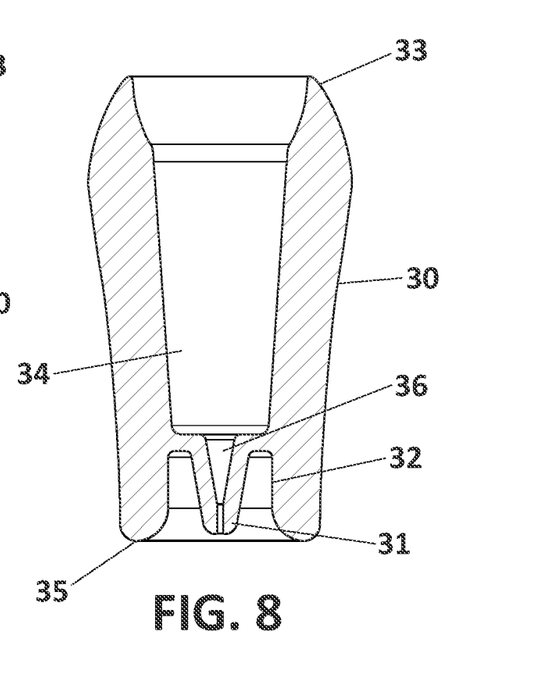
FIG. 8 shows a cross-sectional view of the pipette adapter of FIG. 5.
Figure 9:
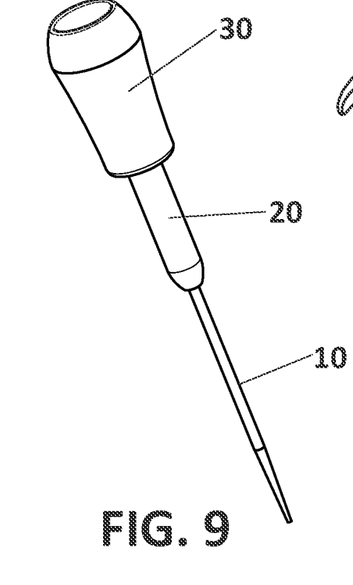
FIG. 9 shows a perspective view of a cryostorage device described herein comprising a capillary element and a pipette adapter.

FIG. 9 shows the adapter 30 coupled to the storage device 100, forming a two-component cryostorage device 200. For coupling both components, the lower end 35 of the adapter 30 receives the inside of the upper end 22 of the hollow body 20 of the device 100. Upon insertion of the hollow body 20 inside the recess 32 of the adapter 30, the conical peak 31 forces the self-sealing valve 24 to open. The device 100 is therefore coupled to the adapter 30 and the cavity 34 of said adapter 30 is connected to the passage 23 inside the hollow body 20. When the adapter 30 and the device 100 are decoupled or separated, the conical peak 31 can be released from the hollow body 20 and the self-sealing valve 24 closes.

Figure 10:
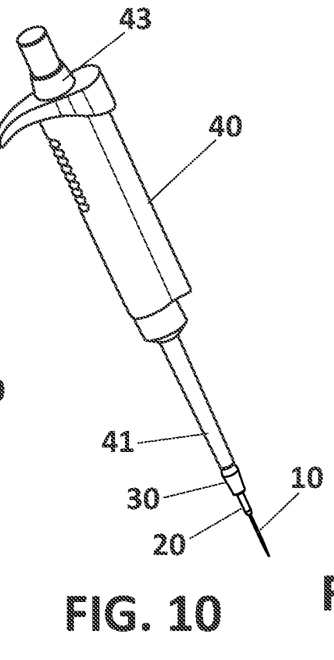
FIG. 10 shows a perspective view of a cryostorage device described herein comprising a pipette and the device of FIG. 9.

As shown in FIG. 10, a pipette 40 can be required to use the cryostorage device 200 having the adapter 30 coupled to the hollow body 20 for loading sample into the straw 10. The pipette 40 can be coupled to the adapter 30 by introducing the tip 42 of an extended portion 41 of the pipette 40 inside the adapter 30 through the opened upper end 33 of the adaptor 30. The pipette 40 can comprise an actuating element 43 for activating the pipette 40.

Figure 11:
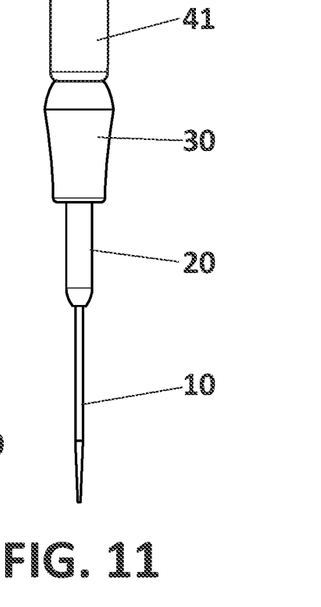
FIG. 11 shows a detailed view of the device of FIG. 9 that shows the coupling of the pipette, the adapter, and the capillary element.
Figure 12:
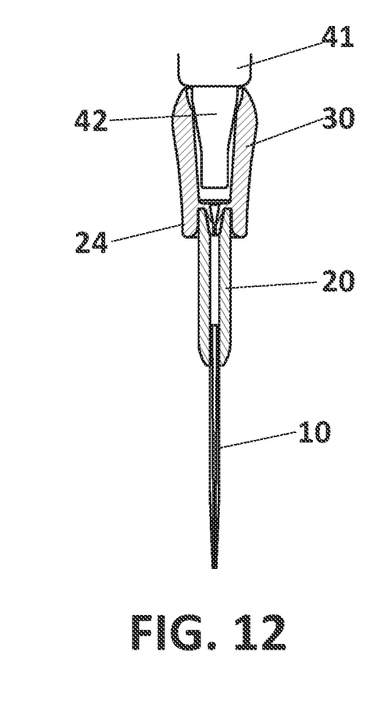
FIG. 12 shows a cross-sectional view of the coupling of FIG. 11.
Figure 13:
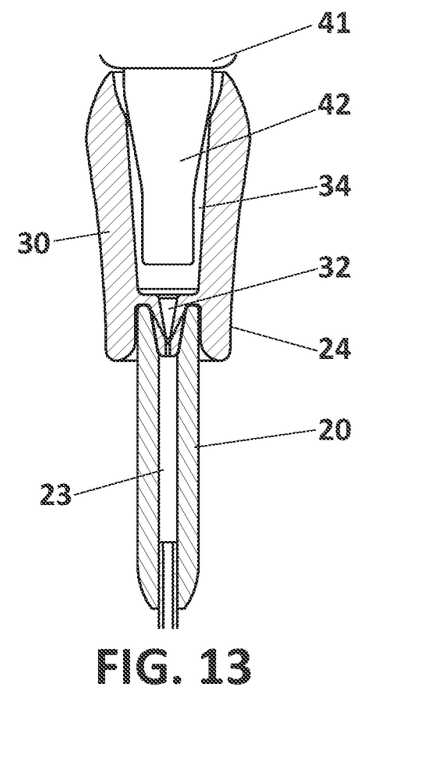
FIG. 13 shows a detailed view of FIG. 12.

FIGS. 11-13 show details of the coupling between the pipette 40 and the cryostorage device 200 formed by the adapter 30, the hollow body 20, and the straw 10. As shown in FIGS. 12 and 13, the tip 42 of the pipette 40 can be introduced into the cavity 34 of the adapter 30 crossing the upper end 33 of the adaptor 30. When the actuator 43 of the pipette 40 is activated and the bottom opening 11 of the straw is introduced to a liquid media, the pipette 40 can apply a negative pressure in the cavity 34 within the adapter 30, in the channel 32 within the conical peak 31 of the adapter 30, in the passage 23 within the hollow body 20, and in the storage volume 13 within the straw 10.

Figures 14, 15:
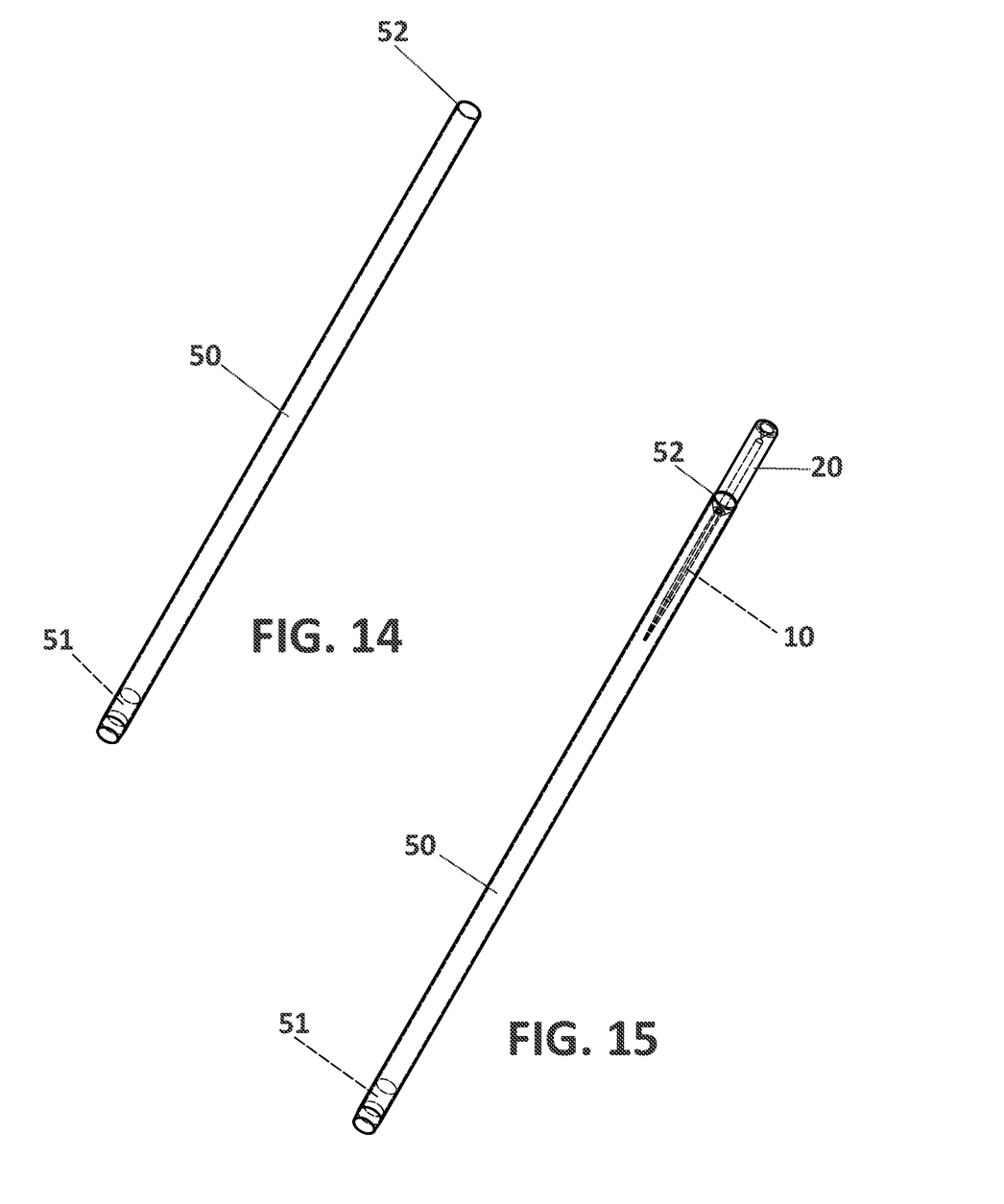
FIG. 14 shows a protective cap or cover of a device described herein.
FIG. 15 shows a device described herein coupled to the protective cap or cover of FIG. 14.

FIG. 14 shows a cover or cap 50. The cap or cover 50 is a hollow body, e.g., a cylindrical hollow body, with a closed end 51 and an opposite opened end 52. The capillary element 10 can be introduced in the cover 50 to protect the elongated portion of the capillary element 10, e.g., prior to submerging the capillary element 10 into LN2 for flash freezing or vitrification, or prior to storing the device 100 in LN2 for long-term cryopreservation. This cover or cap 50 can also prevent direct contact between the LN2 and the sample inside the capillary element 10.

FIG. 15 shows the cryostorage device 100 inside the cap or cover 50 and the hollow body 20 of the cryostorage device 100 working as a plug for the opened end 52 of the cover or cap 50.

FIGS. 20-23 show an embodiment of a cryostorage device 300 comprising a cylindrical tube 60 that partially covers the capillary element 10 and is partially connected within the hollow body 20 such that the cylindrical tube is positioned between the capillary element 10 and the hollow body 20. This cylindrical tube 60 can reinforce the capillary element 10 to reducing the likelihood of breakage of the capillary element 10 when the user manipulates the device 300. In some embodiments, the cylindrical tube 60 only covers an area of the capillary element in which biological sample is not contained such that the cylindrical tube 60 does not affect the thermal pathway or warming rates of the contents of the device 300 during a warming procedure.

In some embodiments, the length of the cylindrical tube is between about 4 mm and about 60 mm. The inner diameter is between about 0.3 mm and about 1.5 mm, and the outer diameter is between about 0.6 mm and about 3.0 mm.

Methods for cryopreservation using a pipette 40, an adapter 30, and a cryostorage device 100 with a hollow body 20 and a straw 10, can include the following steps:
a) Introducing a pipette 40, specifically the tip 42 inside the opened upper end 33 of an adapter 30 such that the tip 42 is inserted into the cavity 34 of the adapter 30;
b) Introducing the hollow body 20 of a storage device 100 inside the opened lower end 35 of the adapter 30 such that the conical peak 31 of the adapter 30 opens the self-sealing valve 24 of the hollow body 20;
c) Introducing the bottom opening 11 of the straw 10 of the storage device 100 into media containing a sample;
d) Activating the pipette 40 for loading the straw 10 with the sample;
e) Withdrawing the bottom opening 11 of the straw 10 out from the media;
f) Introducing the straw 10 into a cooling media (e.g., LN2) to achieve flash freezing or vitrification of the loaded sample;
g) Decoupling the pipette 40 and adapter 30 from the storage device 100 by separating the conical peak 31 from the hollow body 20 such that the self-sealing valve 24 closes said hollow body 20; and
h) Introducing the straw 10 of the cryostorage device 100 into a cap or cover 50 to seal and protect the straw 10 from breakage when inserted in a LN2 tank, and protect the sample in the straw 10 from direct contact with the LN2 such that the hollow body 20 of the device 100 acts as a closure of the open end of the cap or cover 50.

In some embodiments, steps a) and b) of the above method can be swapped.

Figure 16:
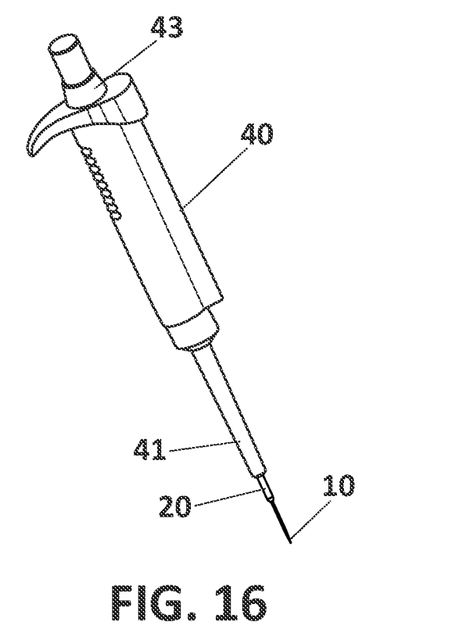
FIG. 16 shows a pipette directly coupled to a device described herein without an adapter.
Figure 17:
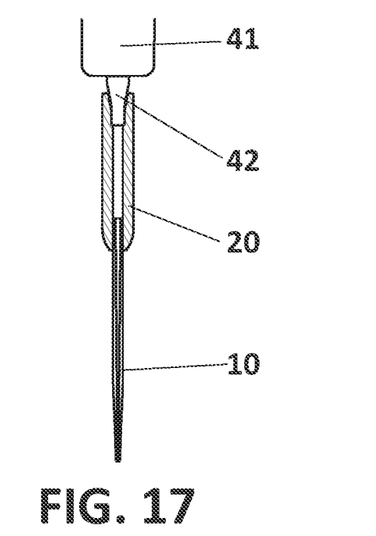
FIG. 17 shows a detailed view of a pipette directly coupled to a device described herein without an adapter.

Alternatively, as shown in FIGS. 16 and 17, the cryostorage device 100 with the hollow body 20 and the straw or capillary element 10, can be directly coupled to a pipette 40 by introducing the tip 42 of the extended portion 41 of the pipette 40 through the self-sealing valve 24 and inside the hollow body 20.

Methods for cryopreservation using a pipette 40 and a cryostorage device 100 with a hollow body 20 and a straw 10, can include the following steps:
a) Introducing a pipette 40, specifically the tip 42 inside the opened upper end 22 of the hollow body 20 such that the tip 42 is inserted into the hollow body 20 and opens the self-sealing valve 24 of the hollow body 20;
b) Introducing the bottom opening 11 of the straw 10 of the storage device 100 into sample;
c) Activating the pipette 40 for loading the straw 10 with the sample;
d) Withdrawing the bottom opening 11 of the straw 10 out from the media;
e) Introducing the straw 10 into a cooling media (e.g., LN2) to achieve flash freezing or vitrification of the loaded sample;
f) Decoupling the pipette 40 and the storage device 100 by separating the tip 42 of the hollow body 20 such that the self-sealing valve 24 closes said hollow body 20; and
g) Introducing the straw 10 of the cryostorage device 100 into a cap or cover 50 to seal and protect said straw 10 from breakage when inserted in a LN2 tank, and protect the sample in the straw 10 from direct contact with the LN2 such that hollow body 20 of the device 100 acts as closure of the open end of the cap or cover 50.

In some embodiments, the storage device 100 with the hollow body 20 and the straw or capillary element 10, can be manually activated without a pipette to load and unload sample into and out of the straw 10. For example, a user can use fingers to actuate the hollow body 20 by pressing and releasing, thereby reducing or increasing a volume of the passage 23 to create positive or negative pressure within the straw 10, respectively. For aspirating the sample by suction, the pressure applied to the hollow body 20 can decrease, thereby increasing the volume of the passage 23 and creating negative pressure inside the straw 10. For unloading the sample from the straw 10, e.g., after cryopreservation, warming, or thawing of the device 100 by placement in warm media, pressure can be applied to the hollow body 20 again, thereby reducing the volume of the passage 23 and creating positive pressure inside the straw 10.

Figure 18:
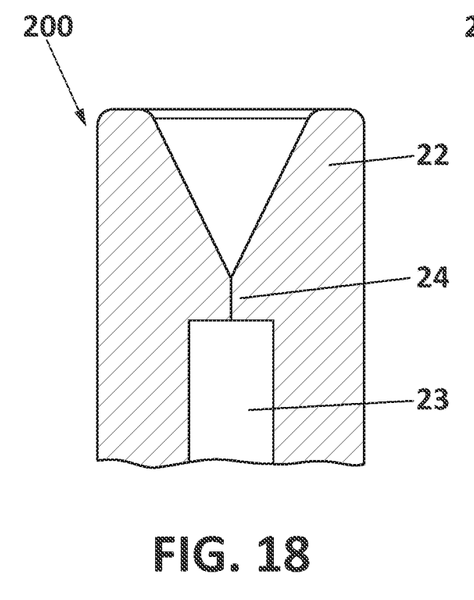
FIG. 18 shows a detailed view of a self-sealing valve in the hollow body of a device described herein.
Figure 19:
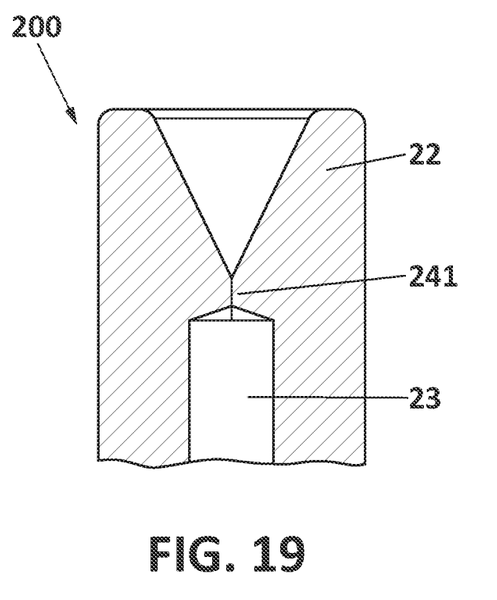
FIG. 19 shows a detailed view of a self-sealing valve in the hollow body of a device described herein.
Figures 20, 21, 22, 23:
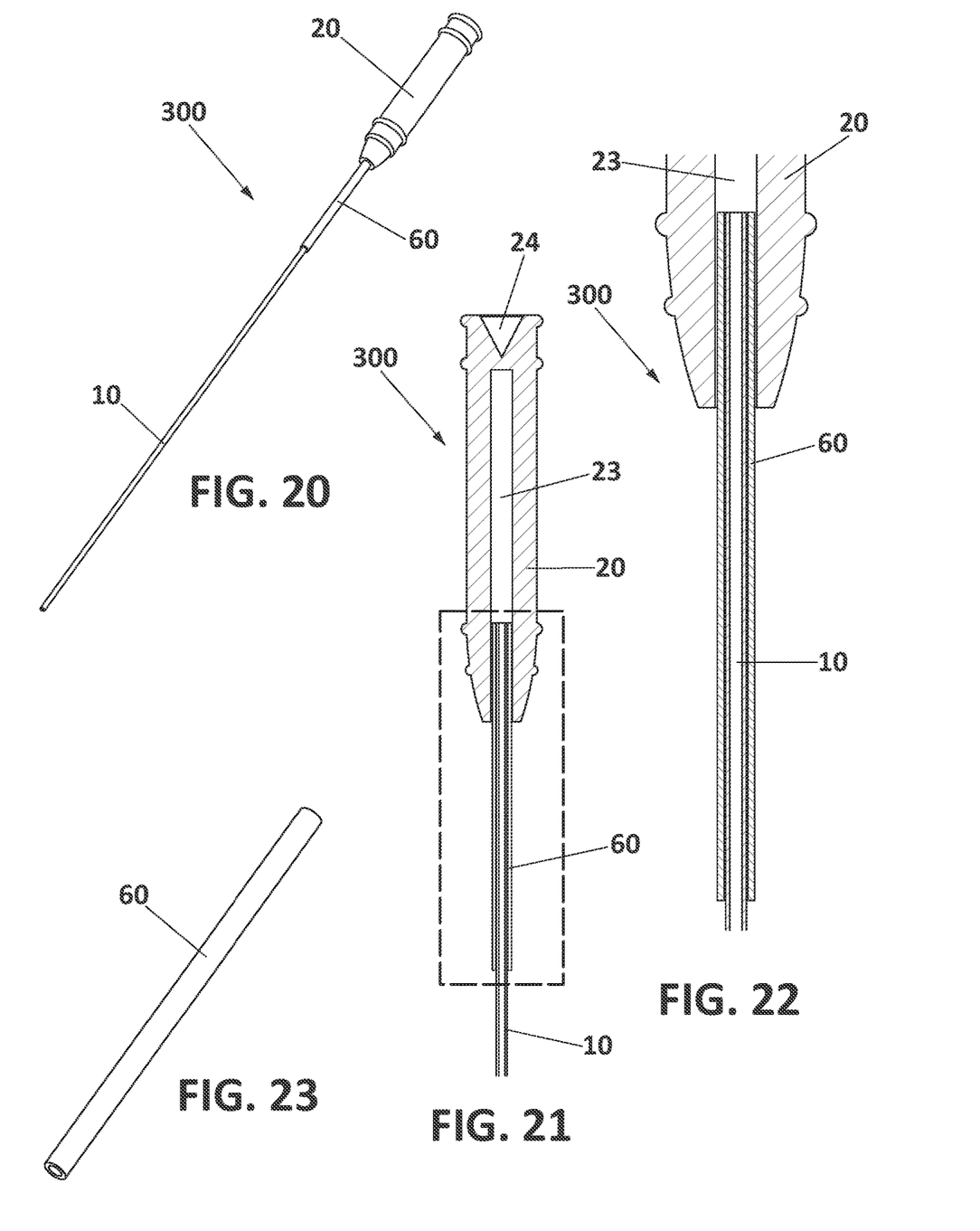
FIG. 20 shows a perspective view of a device with a cylindrical tube described herein.
FIG. 21 shows a cross-sectional view of a part of the device of FIG. 20.
FIG. 22 shows an enlarged cross-sectional view of part of the device of FIG. 20.
FIG. 23 shows a perspective view of a cylindrical tube described herein.

FIG. 18 shows a cross-sectional view of a self-sealing valve 24 valve in the hollow body 20 of the cryostorage device 200. FIG. 19 shows a cross-sectional view of another embodiment of a self-sealing 24 in the hollow body 20 the cryostorage device 200.

EMBODIMENTS

Embodiment A1. A cryostorage device (100), comprising:
a capillary element or straw (10) that comprises an elongated hollow portion between a bottom opening (11) and a top opening (12); and
a hollow body (20) that comprises a lower end (21), an upper end (22), and a self-sealing valve (24), wherein the self-sealing valve (24) is at the upper end (22), wherein the hollow body (20) is connected to the top opening (12) of the elongated hollow portion through the lower end (21).

Embodiment A2. The device of embodiment A1, wherein the hollow body is comprised of an elastomeric material.

Embodiment A3. The device of embodiment A1 or A2, wherein the hollow body is configured to aspirate a sample in the device and expel the sample out of the device.

Embodiment A4. The device of any one of embodiments A1-A3, further comprising a pipette, wherein the device is adapted to be actuated with the pipette.

Embodiment A5. The device of embodiment A4, wherein the pipette is a micropipette or a robotized pipette.

Embodiment A6. The device of any one of embodiments A1-A4, further comprising a pipette adapter (30) comprising:
- an opened lower end (35) that comprises a conical peak (31);
- an opened upper end (33) that is connected to a cavity (34) within the adapter (30), wherein the opened upper end (33) is configured to receive a pipette; and
- a channel (36) within the conical peak (31), wherein the channel connects the cavity (34) and the hollow body (20), wherein the conical peak (31) opens the sealing valve (24) of the hollow body (20) when the hollow body (20) is coupled to the adapter (30).

Embodiment A7. A pipette adapter (30), comprising:
- an opened lower end (35), for coupling to the upper end of a cryostorage device (100);
- an opened upper end connected to a cavity inside the adapter, for receiving a pipette; and
- a channel within the conical peak, wherein the channel connects the cavity and the opened lower end, wherein the pipette adapter (30) connects a pipette and a cryostorage device (100).

Embodiment A8. The pipette adapter of embodiment A6 or A7, further comprising a concentric recess (32) that surrounds the conical peak (31).

Embodiment B1, A cryostorage device, comprising:
a) a capillary element that comprises an elongated hollow portion between a bottom opening and a top opening; and
b) a hollow body that comprises a lower end, an upper end, and a self-sealing valve, wherein the self-sealing valve is at the upper end, wherein the hollow body is connected to the top opening of the elongated hollow portion of the capillary element through the lower end of the hollow body.

Embodiment B2, The cryostorage device of embodiment B1, wherein the hollow body is comprised of a material that is freeze tolerant.

Embodiment B3. The cryostorage device of embodiment B1 or B2, wherein the hollow body is comprised of an elastomeric material.

Embodiment B4, The cryostorage device of any one of embodiments B1-B3, wherein the hollow body is configured to aspirate a sample into the cryostorage device through the capillary element.

Embodiment B5. The cryostorage device of any one of embodiments B1-B4, wherein the hollow body is configured to expel a sample from the cryostorage device through the capillary element.

Embodiment B6. The cryostorage device of any one of embodiments B1-B5, wherein the self-sealing valve is configured to release excess pressure from the capillary element.

Embodiment B7. The cryostorage device of any one of embodiments B1-B6, further comprising a pipette, wherein the pipette is operably connected to the upper end of the hollow body such that the pipette actuates the cryostorage device.

Embodiment B8. The cryostorage device of embodiment B7, wherein the pipette is a micropipette.

Embodiment B9. The cryostorage device of embodiment B7 or B8, wherein the pipette is a robotized pipette.

Embodiment B10. The cryostorage device of any one of embodiments B1-B9, further comprising a cylindrical tube, wherein the cylindrical tube connects to the hollow body and connects to the capillary element, wherein the cylindrical tube partially shrouds the capillary element at the top opening of the capillary element, wherein the cylindrical tube is configured to reinforce the capillary element.

Embodiment B11. The cryostorage device of any one of embodiments B1-B10, further comprising a detachable protective cover that comprises an opened end and a closed end, wherein the cover is connected to the hollow body at the opened end and shrouds the capillary element.

Embodiment B12. The cryostorage device of any one of embodiments B1-B11, further comprising a pipette adapter, wherein the pipette adapter is operably connected to the hollow body of the cryostorage device and a pipette, wherein the pipette adapter comprises:
a) a lower end that comprises a conical peak, wherein the lower end is configured to receive the hollow body;
b) an upper end that is connected to a cavity within the pipette adapter, wherein the upper end is configured to receive the pipette; and
c) a channel within the conical peak, wherein the hollow body and the cavity are fluidically connected through the channel,
wherein the conical peak opens the self-sealing valve of the hollow body when the hollow body is coupled to the adapter.

Embodiment B13. The cryostorage device of embodiment B12, wherein self-sealing valve connects to the conical peak of the lower end of the pipette adapter, wherein the self-sealing valve reduces a likelihood of leakage of a liquid sample contained within the cryostorage device.

Embodiment B14. A pipette adapter for coupling a cryostorage device and a pipette, comprising:
a) a lower end configured to receive the cryostorage device, wherein the lower end comprises a conical peak and a concentric recess that surrounds the conical peak;
b) an upper end configured to receive the pipette, wherein the upper end comprises a cavity; and
c) a channel within the conical peak, wherein the channel fluidically connects the conical peak of the lower end and the cavity of the upper end.

Embodiment B15. The pipette adapter of embodiment B14, wherein the cryostorage device comprises a self-sealing valve, wherein self-sealing valve connects to the conical peak of the lower end of the pipette adapter, wherein the self-sealing valve reduces a likelihood of leakage of a liquid sample contained within the cryostorage device.

Embodiment B16. A method of cryopreservation of a biological sample, comprising:
a) aspirating the biological sample into a cryostorage device, wherein the cryostorage device comprises:
i) a capillary element that comprises an elongated hollow portion between a bottom opening and a top opening; and
ii) a hollow body that comprises a lower end, an upper end, and a self-sealing valve, wherein the self-sealing valve is at the upper end, wherein the hollow body is connected to the top opening of the elongated hollow portion of the capillary element through the lower end of the hollow body,
wherein the aspirating the biological sample into the cryostorage device comprises aspirating the biological sample into the elongated hollow portion of the capillary element by applying pressure to the hollow body; and b) cryopreserving the biological sample in the elongated hollow portion of the capillary element.

Embodiment B17. The method of embodiment B16, wherein the hollow body is comprised of a material that is freeze tolerant.

Embodiment B18. The method of embodiment B16 or B17, wherein the hollow body is comprised of an elastomeric material.

Embodiment B19. The method of any one of embodiments B1-B18, wherein the hollow body is configured to aspirate a sample into the cryostorage device through the capillary element.

Embodiment B20. The method of any one of embodiments B1-B19, wherein the hollow body is configured to expel a sample from the cryostorage device through the capillary element.

Embodiment B21. The method of any one of embodiments B1-B20, wherein the self-sealing valve is configured to release excess pressure from the capillary element.

Embodiment B22. The method of any one of embodiments B1-B21, wherein the cryostorage device further comprises a cylindrical tube, wherein the cylindrical tube connects to the hollow body and connects to the capillary element, wherein the cylindrical tube partially shrouds the capillary element at the top opening of the capillary element, wherein the cylindrical tube is configured to reinforce the capillary element.

Embodiment B23. The method of any one of embodiments B1-B22, further comprising, subsequent to the aspirating the biological sample into the cryostorage device, coupling a detachable protective cover to the hollow body of the cryostorage device, wherein the cover comprises an opened end and a closed end, wherein the cover is connected to the hollow body at the opened end and shrouds the capillary element.

Embodiment B24. The method of any one of embodiments B1-B23, wherein cryopreserving of the biological sample comprises contacting the cryostorage device with a coolant.

Embodiment B25. The method of embodiment B24, wherein the coolant comprises liquid nitrogen.

Embodiment B26. The method of any one of embodiments B1-B25, further comprising coupling the cryostorage device to a pipette, wherein the pipette is operably connected to the upper end of the hollow body such that the pipette actuates the cryostorage device, wherein the aspirating of the biological sample into the cryostorage device is actuated by the pipette.

Embodiment B27. The method of any one of embodiments B1-B26, wherein the cryostorage device is coupled to the pipette by a pipette adapter.

Embodiment B28. The method of embodiment B27, wherein the pipette adapter is operably connected to the upper end of the hollow body and the pipette, wherein the pipette adapter comprises:

a) a lower end that comprises a conical peak, wherein the lower end is configured to receive the hollow body;

b) an upper end that is connected to a cavity within the pipette adapter, wherein the upper end is configured to receive the pipette; and c) a channel within the conical peak, wherein the hollow body and the cavity are fluidically connected through the channel, wherein the conical peak opens the self-sealing valve of the hollow body when the hollow body is coupled to the adapter.

Embodiment B29. The method of embodiment B27 or B28, wherein self-sealing valve connects to the conical peak of the lower end of the pipette adapter, wherein the self-sealing valve reduces a likelihood of leakage of a liquid sample contained within the cryostorage device.

Embodiment B30. The method of any one of embodiments B1-B29, further comprising, subsequent to the cryopreserving the biological sample in the elongated hollow portion of the capillary element, warming the biological sample in the elongated hollow portion of the capillary element.

Embodiment B31. The method of embodiment B30, wherein warming of the biological sample comprises contacting the cryostorage device with a warming agent.

Embodiment B32. The method of embodiment B30 or B31, further comprising, subsequent to the warming the biological sample, expelling the biological sample from the cryostorage device by applying pressure to the hollow body.

Embodiment B33. The method of any one of embodiments B1-B32, further comprising coupling the cryostorage device to a pipette, wherein the expelling of the biological sample from the cryostorage device is actuated by the pipette.

What is claimed is:

1. A cryostorage device, comprising:
a) a capillary element that comprises an elongated hollow portion between a bottom opening and a top opening; and
b) a hollow body that comprises a lower end, an upper end, and a self-sealing valve, wherein the self-sealing valve is at the upper end, wherein the hollow body is connected to the top opening of the elongated hollow portion of the capillary element through the lower end of the hollow body.

2. The cryostorage device of claim 1, wherein the hollow body is comprised of a material that is freeze tolerant.

3. The cryostorage device of claim 1, wherein the hollow body is comprised of an elastomeric material.

4. The cryostorage device of claim 1, wherein the hollow body is configured to aspirate a sample into the cryostorage device through the capillary element.

5. The cryostorage device of claim 1, wherein the hollow body is configured to expel a sample from the cryostorage device through the capillary element.

6. The cryostorage device of claim 1, wherein the self-sealing valve is configured to release excess pressure from the capillary element.

7. The cryostorage device of claim 1, further comprising a pipette, wherein the pipette is operably connected to the upper end of the hollow body such that the pipette actuates the cryostorage device.

8. The cryostorage device of claim 7, wherein the pipette is a micropipette.

9. The cryostorage device of claim 7, wherein the pipette is a robotized pipette.

10. The cryostorage device of claim 1, further comprising a cylindrical tube, wherein the cylindrical tube connects to the hollow body and connects to the capillary element, wherein the cylindrical tube partially shrouds the capillary element at the top opening of the capillary element, wherein the cylindrical tube is configured to reinforce the capillary element.

11. The cryostorage device of claim 1; further comprising a detachable protective cover that comprises an opened end and a closed end, wherein the cover is connected to the hollow body at the opened end and shrouds the capillary element.

12. The cryostorage device of claim 1, further comprising a pipette adapter, wherein the pipette adapter is operably connected to the hollow body of the cryostorage device and a pipette, wherein the pipette adapter comprises:
   a) a lower end that comprises a conical peak, wherein the lower end is configured to receive the hollow body;
   b) an upper end that is connected to a cavity within the pipette adapter, wherein the upper end is configured to receive the pipette; and
   c) a channel within the conical peak, wherein the hollow body and the cavity are fluidically connected through the channel, wherein the conical peak opens the self-sealing valve of the hollow body when the hollow body is coupled to the adapter.

13. The cryostorage device of claim 12, wherein self-sealing valve connects to the conical peak of the lower end of the pipette adapter, wherein the self-sealing valve reduces a likelihood of leakage of a liquid sample contained within the cryostorage device.

14. A pipette adapter for coupling a cryostorage device and a pipette, comprising:
   a) a lower end configured to receive the cryostorage device, wherein the lower end comprises a conical peak and a concentric recess that surrounds the conical peak;
   b) an upper end configured to receive the pipette, wherein the upper end comprises a cavity; and
   c) a channel within the conical peak, wherein the channel fluidically connects the conical peak of the lower end and the cavity of the upper end.

15. The pipette adapter of claim 14, wherein the cryostorage device comprises a self-sealing valve, wherein self-sealing valve connects to the conical peak of the lower end of the pipette adapter, wherein the self-sealing valve reduces a likelihood of leakage of a liquid sample contained within the cryostorage device.

* * * * *